(12) United States Patent
Daily et al.

(10) Patent No.: US 8,756,183 B1
(45) Date of Patent: Jun. 17, 2014

(54) SYSTEM FOR REPRESENTING, STORING, AND RECONSTRUCTING AN INPUT SIGNAL

(75) Inventors: Michael J. Daily, Thousand Oaks, CA (US); Michael D. Howard, Westlake Village, CA (US); Yang Chen, Westlake Village, CA (US); Rashmi N. Sundareswara, Los Angeles, CA (US); David W. Payton, Calabasas, CA (US)

(73) Assignee: HRL Laboratories, LLC, Malibu, CA (US)

(*) Notice: Subject to any disclaimer, the term of this patent is extended or adjusted under 35 U.S.C. 154(b) by 353 days.

(21) Appl. No.: 13/160,336

(22) Filed: Jun. 14, 2011

Related U.S. Application Data

(60) Provisional application No. 61/354,678, filed on Jun. 14, 2010.

(51) Int. Cl.
*G06E 1/00* (2006.01)
*G06E 3/00* (2006.01)
*G06F 15/18* (2006.01)
*G06G 7/00* (2006.01)

(52) U.S. Cl.
USPC .......................................................... 706/20

(58) Field of Classification Search
CPC ....... G06N 99/005; G06N 3/08; G06N 3/063; G06N 3/02; G06Q 10/10
USPC ........................................ 706/20, 16, 15, 62
See application file for complete search history.

(56) References Cited

PUBLICATIONS

Izhikevich, "Polychronization: Computation with Spikes", Neural Computation 18, 245-282 (2006), 2005 Massachusetts Institute of Technology.*

Lazar et al, "Fading memory and time series prediction in recurrent networks with different forms of plasticity", Neural Networks 20 (2007) 312-322, 2007 Special Issue.*

Izhikevich et al, "Spike-timing Dynamics of Neuronal Groups", Oxford University Press 2004, all rights reserved, Cerebral Cortex Aug. 2004;14:933-944.*

Park, "Continuous Time Correlation Analysis Techniques for Spike Trains", A Thesis Presented to the Graduate School of the University of Florida in Partial Fulfillment of the Requirements for the Degree of Master of Science University of Florida 2007.*

Martinez et al, "Algorithms for Structural and Dynamical Polychronous Groups Detection", ICANN 2009, Part II, LNCS 5769, pp. 75-84, 2009.*

(Continued)

*Primary Examiner* — Jeffrey A Gaffin
*Assistant Examiner* — Ilya Trakovenko
(74) *Attorney, Agent, or Firm* — Tope-McKay & Associates

(57) ABSTRACT

Described is a system for representing, storing, and reconstructing an input signal. The system constructs an index of unique polychronous groups (PCGs) from a spiking neuron network. Thereafter, a basis set of spike codes is generated from the unique PCGs. An input signal can then be received, with the input signal being spike encoded using the basis set of spike codes from the unique PCGs. The input signal can then be reconstructed by looking up in a reconstruction table, for each unique PCG in the basis set in temporal order according to firing times, anchor neurons. Using a neuron assignment table, an output location can be looked up for each anchor neuron to place a value based on the firing times of each unique PCG. Finally, the output locations of the anchor neurons can be compiled to reconstruct the input signal.

19 Claims, 13 Drawing Sheets

(56) References Cited

PUBLICATIONS

Izhikevich, "Polychronous Wavefront Computations", The Neurosciences Institute, 10640 John Jay Hopkins Drive, San Diego, International Journal of Bifurcation and Chaos, vol. 19, No. 5 (2009) 1733-1739.*

Paugam-Moisy et al, "Delay Learning and Polychronization for Reservoir Computing", LIRIS, UMR CNRS 5205, Universit'e Lyon 2, France, Elsevier Dec. 26, 2007.*

Gutmann, "Learning reconstruction and prediction of natural stimuli by a population of spiking neurons", In proceeding of ESANN 2009, 17th European Symposium on Artificial Neural Networks Bruges, Belgium, Apr. 22-24, 2009.*

Hunter, et al, "Improving Associative Memory in a Network of Spiking Neurons", Artificial Neural Networks—ICANN 2008 18th International Conference, Prague, Czech Republic, Sep. 3-6, 2008, Proceedings, Part II.*

Wills, "Computation with Spiking Neurons", Clare College Cambridge A dissertation submitted in candidature for the degree of Doctor of Philosophy, University of Cambridge, Sep. 2004.*

Paugam-Moisy, "Spiking Neuron Networks a Survey", IDIAP—RR 06-11, February 2006.*

Vertes et al, "Neural networks with small-world topology are optimal for encoding based on spatiotemporal patterns of spikes", Published: Jul. 13, 2009, BMC Neuroscience 2009, 10 (Suppl 1).*

Thorpe et al, "Spike-based strategies for rapid processing", Published in Neural Networks, 14(6-7), 715-726, 2001.*

Yang et al, "A Neuromorphic Depth-From-Motion Vision Model With STDP Adaptation", IEEE Transactions on Neural Networks, vol. 17, No. 2, March 2006.*

Ungerleider, L & Haxby, J. 'What' and 'where' in the human brain. Curr. Opin. Neurobiol. 4, 157-165 (1994).

Uysal, H. Sathyendra, and J.G. Harris. A duplex theory of spike coding in the early stages of the auditory system. In Proc. of IEEE International Conference on Acoustics, Speech and Signal Processing (ICASSP), vol. IV, pp. 733-736, Honolulu, Hawaii, Apr. 2007.

Uysal, H. Sathyendra, and J.G. Harris. Spike-based feature extraction for noise robust speech recognition using phase synchrony coding. In Proc. of IEEE International Symposium on Circuits and Systems (ISCAS), pp. 1529-1532, New Orleans, LA, May 2007.

D. Verstraeten, . B. Schrauwen, D. Stroobandt and J. Van Campenhout, Isolated word recognition with the Liquid State Machine: a case study, Information Processing Letters, vol. 95, Issue 6, Sep. 30, 2005, pp. 521-528.

Wikipedia, http://en.wikipedia.org/wiki/Levenshtein_distance, 2009.

C. M. Wessinger, VanMeter, B. Tian, Van Lare, Pekar, and P. Rauschecker, Hierarchical Organization of the Human Auditory Cortex Revealed by Functional Magnetic Resonance Imaging, J. of Cognitive Science, Jan. 1, 2001, vol. 13, No. 1, pp. 1-7.

Y. Xue, L. Yang, and S. Haykin. Decoupled echo state networks with lateral inhibition, IEEE Neural Networks, 10(10), 2007.

T. Yu, A. Schwartz, J.G. Harris, M. Slaney, and S-C Liu. "Periodicity detection and localization using spike timing from the AER ear." In Proc. of IEEE International Symposium on Circuits and Systems (ISCAS), Taipei, Taiwan, May 2009.

Raichelgauz, I., Odinaev, K., & Zeevi, Y. Y. (2006), Natural signal classification by neural cliques and phase-locked attractors, Conference Proceedings of the International Conference of IEEE Engineering in Medicine and Biology Society, Suppl, 6693-6697.

A. Adami, et al. (2003) Modeling Prosodic Dynamics for Speaker Recognition, IEEE ICASSP.

A. Batliner and R. Huber (2007) Speaker Characteristics and Emotion Classification. In: Muller, C. (Ed.): Speaker Classification I, LNAI 4343, pp. 138-151.

T. Bocklet and E. Shriberg (2009). Speaker Recognition Using Syllable-Based Constraints for Cepstral Frame Selection , Proc. ICASSP, Taipei, Taiwan.

Bruce, C., Desimone, R. & Gross. C. Visual properties of neurons in a polysensory area in the superior temporal sulcus of the macaque. J. Neurophysiol. 46, 369-384 (1981).

L. Burgel et al, Robust Speaker Recognition over Varying Channels. Report from JHU Workshop 2008. Accessed on Apr. 20, 2009. http://www.clsp.jhu.edu/workshops/ws08/documents/jhu_report_main.pdf.

J.P. Campbell, D.A. Reynolds, R.B. Dunn (2003), Fusing High- and Low-Level Features for Speaker Recognition, In Proc. Eurospeech in Geneva, Switzerland, ISCA, pp. 2665-2668, Sep. 1-4, 2003.

S.P. Davis and P. Mermelstein (1980), Comparison of parametric representations for monosyllabic word recognition in continuously spoken sentences. IEEE ICASSP, 28(4): 357-366.

Doddington, G.: Speaker Recognition Based on Idiolectial Differences Between Speakers. (2001) In: Dalsgaard, P., Lindberg, B., Benner, H., Tan, Z. (eds.) Proc EuroSpeech, Aalborg, Denmark, pp. 2521-2524.

G. M. Edelman. Beural Darwinism: The theory of neuronal group selection. New York: Basic Books, 1987.

Elia Formisao, Federico De Martino, Milen Bonte and Rainer Goebel, "Who" is Saying "What"? Brain-Based Decoding of Human Voice and Speech, Science, vol. 322, Nov. 7, 2008.

T. Ganchev, N. Fakotakis, and G. Kokkinakis (2005), "Comparative evaluation of various MFCC implementations on the speaker verification task," in 10th International Conference on Speech and Computer (SPECOM 2005), vol. 1, pp. 191-194.

Gunduz, A. and Principe, J. C. 2009. Correntropy as a novel measure for nonlinearity tests. Signal Process. 89,1(Jan. 2009), 14-23.

S. Haeuslet and W. Maass, A statistical analysis of information-processing properties of lamina-specific cortical microcircuit models, Cerebral Cortex, 17(1):149-162, 2006.

J.G. Harris, and I. Uysal (2009). "Biologically plausible speech recognition using spike-based phase locking." In Proc. of IEEE International Symposium on Ciruits and Systems (ISCAS), Taipei, Taiwan.

Hermansky, H. and N. Morgan (1984). "RASTA Processing of Speech." IEEE Transations on Speech and Audio 2: 578-589.

Iannella, N. Back, A., "A spiking neural network architecture for nonlinear function approximation," Neural Networks for Signal Processing IX, 1999. Proc. Of the 1999 IEEE Signal Processing Society Workshop, Aug. 1999, p. 139-146.

Izhikevich, Eugene M. (2006) "Polychronization: Computation with Spikes", Neural Computation 18, 245-282.

Jhuang, H.; Serre, T.: Wolf, L.; Poggio, T.; "A Biologically Inspired System for Action Recognition," Computer Vision, 2007,. IEEE 11th International Conference on, Oct. 14-21, 2007 pp. 1-8.

S. S. Kajarekar, N. Scheffer, M. Graciarena, E. Shriberg, A. Stoleke, L. Ferrer, & T. Bocklet (2009), The SRI NIST 2008 Speaker Recognition Evaluation System. To appear in Proc. IEEE ICASSP, Taipei. (PDF).

P. Kanerca, "Sparse Distributed Memory and Related Models," In M.H.Hassoun, ed., Associative Neural Memories: Theory and Implementation, pp. 50-76. New York: Oxford University Press, 1993.

P. Knusel, R.Wyss, P. Konig,and P. Verschure (2004), "Decoding a Temporal Population Code," Neural Computation 16, 2079-2100.

Lindsey, B, G.,Morris. K. F., Shannon. R.. & Gerstein, G. L. (1997). Repeated patterns of distributed synchrony in neuronal assemblies. J. Neurophysiol., 78, 1714-1719.

S. Loiselle, J. Rouat, D. Pressnitzer, & S. Thorpe (Jul. 31-Aug. 4, 2005). Exploration of Rank Order Coding with Spiking Neural Networks for Speech Recognition. Paper presented at the Proceedings of International Joint Conference on Neural Networks, Montreal, Canada.

Maass, W., T. Natschl, and H. Markram, "A Model for Real-Time Computation in Generic Neural Microcircuits," in NIPS 15, 2001.

Maass, Wolfgang; Natschläger, Thomas; and Markram, Henry (2002). "Real-time computing without stable slates: a new framework for neural comutation based on perlubations" . Neural Computation 14 (11): 2531-60.

Maass, Wolfgang: Markram, Henry, "On the Computational Power of Recurrent Circuits of Spike Seurons", Journal of Computer and System Sciences 69 (4): 593-616, 2004.

Maier, W and B. Miller, "A Minimal Model for the Study of Polychronous Groups," arXiv:0806. 1070v1, 2008.

(56) References Cited

OTHER PUBLICATIONS

Martinez, R. and H. Paugam-Moisy, "Algorithms for Structural and Dynamical Polychronous Groups Detection," C. Alippi et al, (Eds.): ICANN 2009, Part II, LNCS 5769, pp. 75-84, 2009.
R. Meddis (1986), "Simulation of mechanical to neural transduction in the auditory receptor," J. Acoust. Soc. Am., vol. 79, pp. 702-711.
R. Meddis (1988) Simulation of auditory-neural transduction: Further Studies. J. Acoust. Soc. Am. 83, 1056-1063.
K. Sri Rama Murty and B. Yegnanarayana, "Combing Evidence From Residual Phase and MFCC Features for Speaker Recognition" IEEE Signal Processing Letters, vol. 13, No. 1, Jan. 2006.
A.S. Naini and M.M. Homayounpour (2006) Speaker Age Interval and sex identification based on Jitters, Shimmers and Mean MFCC using supervised and unsupervised discriminative classification methods. IEEE ICSP 2006.
Newman, M., et al. (1996), "Speaker Verification through Large Vocabulary Continuous Speech Recognition." ICSLP.
The NIST Year 2008 Speaker Recognition Evaluation Plan, http://www.itl.nist.gov/iad/mig//tests/sre/2008/sre08_evalplan_release4.pdf.
A Oliveri, R Rizzo, A Chella, "An Application of Spike-Timing-Dependent Plasticity to Readout Circuit for Liquid State Machine," IJCNN 2007, International Joint Conference on Neural Networks, Aug. 12-17, 2007, pp. 1441-1445.
H. Paugam-Moisy, R. Martinez and S. Bengio (2008). "Delay learning and polychronization for reservoir computing," Neurocomputing, 71, 1143-1158.
Pelecanos, J. and S. Sridharan (2001), Feature Warping for Robust Speaker Verification. 2001: A Speaker Odyssey: The Speaker Recognition Workshop, Crete, Greece.
S. Schotz and C. Muller, A Study of Acoustic Correlates of Speaker Age In: Muller, C. (Ed.): Speaker Classification II, LNCS (LNAI), vol. 4441, Springer-Heidelberg, 2007.
T. Serre, L. Wolf, and T. Poggio, Object Recognition with Features Inspired by Virtual Cortex, Computer Vision and Pattern Recognition, IEEE Conf. 2005.
Guangji Shi, Maryam Modir Shanechi, and Parham Aarabi, "On the Importance of Phase in Human Speech Recognition," IEEE Transactions on Audio, Speech, and Language Processing, vol. 14, No. 5, Sep. 2006.
Singer, W. & Gray C. M. (1995). Visual feature integration and the temporal correlation hypothesis. Annual Review of Neuroscience, 18, 555-586.
M.D. Skowronski and J.G. Harris (2007). "Noise-robust automatic recognition using a predictive echo state network" IEEE Transactions on Audio, Speech and Language Processing, 15(5):1724-1730.
M.D. Skowronski and J.G. Harris (2007). "Noise-robust automatic speech recognition using a discriminative echo state network."In Proc. of IEEE International Symposium on Circuits and Systems (ISCAS), pp. 1771-1774. New Orleans, LA.
K. Somnez et al (1998) A log-normal model of pitch for prosody-based speaker recognition, Eurospeech, Rhodes, Greece.
Song, S., Miller, K. D., & Abbott, L. F. (2000). Competitive Hebbian learning through spike-timing-dependent synaptic plasticity. Nature Neurosci., 3, 919-926.
Y.Cho, N. Srinivasa and L. Bajaras. (2006) Liquid State Machines and its Application to Prediction of Maulti-Fault Occurrences in Manufacturing Plants. GM R&D Internal Collaborative Gray Report, Dec. 12, 2006.
C. J. Sumner and E. A. Lopez-Poveda, "A revised model of the inner hair cell and audiory-nerve complex," J. Acoust. Soc. Am., vol. 111, No. 5, pp. 2178-2188, 2002.
C. J. Sumner, E. A. Lopez-Proveda, L. P. O'Mard, and R. Meddis, "Adaptation in a revised inner-hair cell model." J. Acoust. Soc. Am., vol. 113, No. 2, pp. 893-901, 2003.
Thomas M. Talavage, Martin I. Sereno, Jennifer R. Melcher, Patrick J. Ledden, Bruce R, Rosen and Anders M. Dale, "Tonotopic Organization in Human Auditory Cortex Revealed by Progressions of Frequency Sensitivity," Journal of Neurophysiology 91:1282-1296, 2004.
Tur, G., Shriberg, E., Stolcke, A., Kajarekar, S. (2007) Duration and Pronunciation Conditioned Lexical Modeling for Speaker Verification, In: Proceedings of Interspeech, Antwerp, Belgium.

\* cited by examiner

Neuron Assignment Table

| Input Subdivision (row, column) | Neuron # |
|---|---|
| 1,1 | 7 |
| 1,2 | 2 |
| 1,3 | 9 |
| 1,4 | 10 |
| 2,1 | 1 |
| 2,2 | 6 |
| 2,3 | 3 |
| 2,4 | 12 |
| 3,1 | 8 |
| 3,2 | 5 |
| 3,3 | 11 |
| 3,4 | 4 |

Reconstruction Table

| PCG# | Starting Time (ms) |
|---|---|
| 85 | 1 |
| 121 | 4 |
| 76 | 6 |
| 233 | 7 |

SYSTEM FOR REPRESENTING, STORING, AND RECONSTRUCTING AN INPUT SIGNAL

PRIORITY CLAIM

This is a non-provisional patent application of U.S. Provisional Application No. 61/354,678, filed on Jun. 14, 2010, entitled, "Hierarchical Polychronous Spiking Memory."

FIELD OF INVENTION

The present invention relates to a recall system and, more particularly, to a system for representing, storing, and reconstructing an input signal using spiking neuron networks.

BACKGROUND OF INVENTION

The use of a pattern-based memory with high capacity and real-time recall has the potential to provide human-like performance in a wide range of applications. The present invention accomplishes this through the use of polychronous groups (PCGs). The whole concept of polychronization is very new as there is little research on PCGs and the use of PCGs as a type of memory.

The theoretical potential is quickly understood within the computational neural science community; however, no one previously understood how to make use of such a huge memory capability for practical applications. By way of example, Izhikevich introduced the concept of polychronous groups (PCGs), and also showed that PCGs respond to different inputs (See Izhikevich, Eugene M., "Polychronization: Computation with Spikes", Neural Computation 18, 245-282 (2006), which is incorporated herein by reference). However, no published work exists on methods for determining the uniqueness of PCGs, or making use of unique PCGs to drive the development of a full system including spike encoding and reconstruction.

Although recurrent neural networks have been studied since the '90s, there was no practical way to control and use them until around 2000 when Maass and others developed their use, calling them Liquid State Machines (LSM) (See Maass, Wolfgang; Natschläger, Thomas; and Markram, Henry. "Real-time computing without stable states: a new framework for neural computation based on perturbations". Neural Computation 14 (11): 2531-60 (2002), and Maass, Wolfgang; Markram, Henry, "On the Computational Power of Recurrent Circuits of Spiking Neurons", Journal of Computer and System Sciences 69 (4): 593-616, (2004)). LSMs have a theoretical capacity bounded by N where N is the number of neurons in the liquid. In practice, their capacity with noisy input is typically below 0.20N. Other associative memories, such as Hopfield/Grossberg networks, have a theoretical capacity of ~0.14N, but cannot practically be used at this capacity.

Although another research group described experiments with a small scale network identifying how many PCGs form under varying parameters, they did not provide a means for determining if a PCG is unique or how to use them in a memory (See Maier, W and B. Miller, "A Minimal Model for the Study of Polychronous Groups," arXiv:0806.1070v1 (2008)).

Yet another research group, Mart et. al, described two types of PCGs, structural and dynamical (See Martinez, R. and H. Paugam-Moisy, "Algorithms for Structural and Dynamical Polychronous Groups Detection," C. Alippi et al. (Eds.): ICANN 2009, Part II, LNCS 5769, pp. 75-84, (2009)). Although they defined PCG in a useful way, they did not analyze uniqueness of PCGs.

Iannella et al. described how a spiking neural model can be used to approximate any non-linear function (See Iannella, N. and Back, A., "A spiking neural network architecture for nonlinear function approximation," Neural Networks for Signal Processing IX, 1999. Proc. Of the 1999 IEEE Signal Processing Society Workshop, August 1999, p. 139-146). While Maass et al. described a universal approximation property of liquid state machines with spiking neurons (See Maass, W., T. Natschl, and H. Markram, "A Model for Real-Time Computation in Generic Neural Microcircuits," in NIPS 15, 2001).

As noted above, previous researches have not yet determined how to use PCGs in memory applications and, instead, have focused on traditional memory techniques. Current programmable computer memories typically use either random access memory (RAM) into hard storage locations or pattern-based access into distributed neural networks. RAM is efficient for storing bits and bytes of data such as numbers, but does not efficiently store spatio-temporal patterns such as sequences of multimedia data. Google's image and video search engines and Microsoft's MyLifeBits are examples of these types of systems. Metadata must be created by humans and stored together with static data structures such as image frames that are combined into temporal sequences. Access to stored sequences is through sequential or in some cases parallel search techniques that must look at every data item stored in hard memory locations. An alternative to these approaches is distributed networks such as Hopfield/Grossberg networks, sparse distribute memories, and recurrent networks. These methods train weights on links between nodes (neurons) using large numbers of sample patterns. Access to stored patterns is through a cue or stimulus that is input to the network, and recall fidelity depends on the signal-to-noise ratio of the input data and the completeness of the input cue. Network models have the advantage that they are capable of noise tolerant, distributed representation of spatial patterns, and parallel recall without search. These methods have difficulty recalling patterns outside the training set, have difficulty generalizing, and most importantly, have low capacity to store patterns, typically about 15% of the number of nodes.

Spiking neural models offer an improvement over previous distributed network models by directly encoding the temporal aspects of the input signal. The newest research on spiking models has resulted in the development of a model that has high fidelity to living neurons and synapses by incorporating conduction delays between neurons and using a learning rule known as spike-timing-dependent plasticity (STDP). These models have been shown to self-organize into polychronous groups (PCGS—time-locked but not synchronous groups). PCGs have great potential for storing large numbers of patterns similar to the human brain. For this kind of spiking neural model with N neurons, there are N! possible PCGs in a fully connected network with delays. Computer simulations using random stimuli have already shown that there are more PCGs than neurons and potentially more PCGs than synapses.

While both PCG's and neural spiking neural models have been described, their properties have not been well understood and no one heretofore mentioned has applied the technology to work backwards from the set of neural spike codes that activate the PCG to the functional approximate to pick the best match to the existing input.

The use of a pattern-based memory with high capacity and real-time recall has the potential to provide human-like performance in a wide range of applications where current programmable machines have failed or been too limited. Thus, a continuing need exists for a reconstruction system that is operable for working backwards from a set of neural spike codes to identifying a best match and reconstructing an input signal in real-time.

SUMMARY OF INVENTION

The present invention is directed to a system for representing, storing, and reconstructing an input signal. The system constructs an index of unique polychronous groups (PCGs) from a spiking neuron network. Thereafter, a basis set of spike codes is generated from the unique PCGs. An input signal can then be received, with the input signal being spike encoded using the basis set of spike codes from the unique PCGs. The input signal can then be reconstructed by looking up in a reconstruction table, for each unique PCG in the basis set in temporal order according to firing times, anchor neurons. Using a neuron assignment table, an output location can be looked up for each anchor neuron to place a value based on the firing times of each unique PCG. Finally, the output locations of the anchor neurons can be compiled to reconstruct the input signal.

In another aspect, constructing an index of unique PCGs can be refined through various processes. For example, the spiking neuron network can be conditioned with random axonal delays. As another example, a refractory period can be employed in generating PCGs, with any PCG firing sequences that saturate being clipped from the index of unique PCGs. As yet another example, a histogram of a correlation metric can be generated to identify PCGs that fall below a predetermined threshold to exclude from the index of unique PCGs.

In yet another aspect, spike encoding the input signal can include an operation of searching for a combination of anchor neurons in the basis set that represents the spatial-temporal data.

Finally, the present invention is also directed to a computer program product and corresponding computer implemented method. The computer program product comprises computer-readable instructions stored on a non-transitory computer-readable medium that are executable by a computer having a processor for causing the processor to perform the operations listed herein. Alternatively, the method comprises acts of causing a computer to perform said operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 10B is a reconstruction table generated from the spiking encoding as depicted in FIG. 10A;

FIG. 10C is an assignment table generated from the spiking encoding as depicted in FIG. 10A.

DETAILED DESCRIPTION

Figure 1:
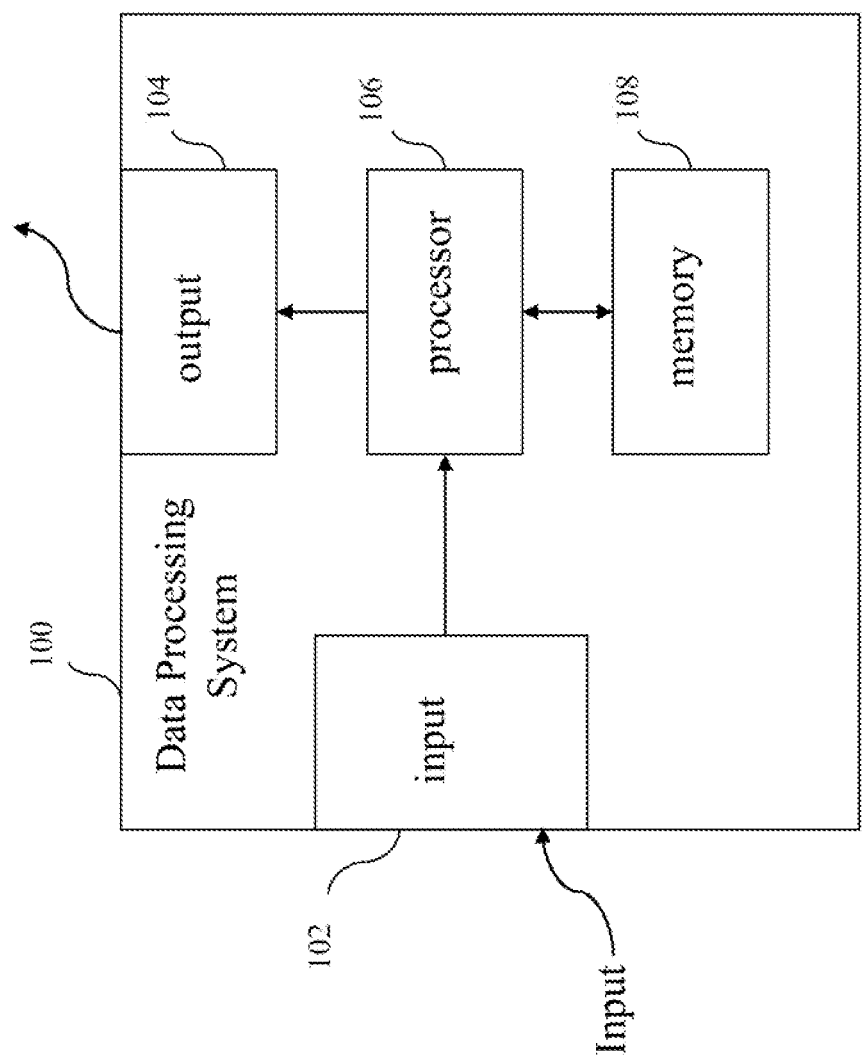
FIG. 1 is a block diagram depicting the components of a system according to the present invention.

The present invention relates to a recall system and, more particularly, to a system for representing, storing, and reconstructing an input signal using spiking neuron networks. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of various principal aspects of the present invention is provided. Subsequently, an introduction provides the reader with a general understanding of the present invention. Finally, specific aspects of the present invention are provided to give the reader a more thorough understanding.

(1) Principal Aspects

The present invention has three "principal" aspects. The first is a system for representing, story, and reconstructing an input signal. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape.

The term "instruction means" as used with respect to this invention generally indicates a set of operations to be performed on a computer, and may represent pieces of a whole program or individual, separable, Software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive. Other, non-limiting examples of computer-readable media include hard disks, read-only memory (ROM), and flash-type memories. These aspects will be described in more detail below.

A block diagram depicting the components of system of the present invention is provided in FIG. 1. The system 100 comprises an input 102 for receiving information from at least one input signal. Non-limiting examples of such input signals include audio, video, speech, etc. Note that the input 102 may include multiple "ports." Typically, input is received from at least one sensor, non-limiting examples of which include video image sensors, cameras, and microphones. An output 104 is connected with the processor for providing information regarding the reconstructed signal to the user or to other systems in order that a network of computer systems may serve as system for representing, storing and reconstructing an input signal. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

As can be appreciated by one skilled in the art, there are several variations in which the hardware of the present invention can be implemented. Without loss of generality, the system can be implemented using either general purpose computing systems, or specialized field programmable gate array (FPGA) or graphics processing unit (GPU) computing, or in low size, weight, power neuromorphic hardware. Since the neural model is required only for the training and index construction phase, this step can be run offline on conventional computers to generate the proper set of tables, and then the spike encoding and reconstruction phase can be implemented in a much simpler hardware configuration (i.e., the system separates training and index construction form input and reconstruction). Alternatively, all of the components can be implemented in a single system that combines training and index construction with input and reconstruction.

Figure 2:
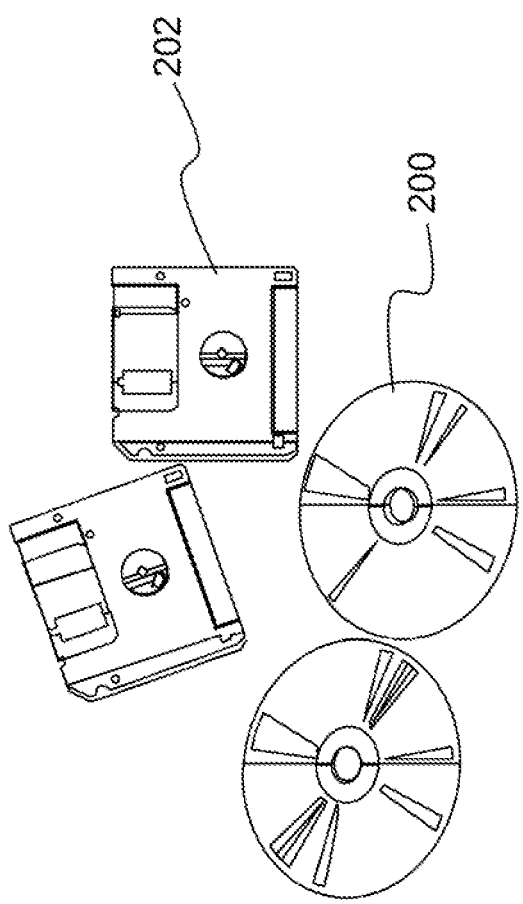
FIG. 2 is an illustration depicting examples of a computer program product.

An illustrative diagram of a computer program product embodying the present invention is depicted in FIG. 2. The computer program product is depicted as an optical disk 200 such as a CD or DVD or a floppy disk 202. However, as mentioned previously, the computer program product generally represents computer-readable instructions stored on any compatible computer-readable medium.

(2) Introduction

Described is a system for representing, storing, and reconstructing an input signal. It includes a method and device for determining and using unique neural groups found in networks of spiking neural models with axonal conduction delays. In operation, the system obtains a large set of unique, dynamic codes derived from groups of time-locked but not synchronously firing neurons called polychronous groups (PCGs). The number of PCGs in this type of model is potentially very large, theoretically approaching N! for N neurons. The system takes advantage of these unique PCGs for use as a high capacity memory.

Some features of the present invention are the extraction of unique PCGs from the neural model, the use of these PCGs as a basis set for spike encoding spatio-temporal input, and the use of an index of unique PCGs with a reconstruction table for reconstructing the input without running the neural model in response to input. While the methods are suitable for implementation in general purpose computing architectures, they are ideal for FPGA/GPU and neuromorphic hardware implementations using special purpose analog neuron circuits that operate with low size, weight, and power. The device may operate separate hardware for training and index construction from input and reconstruction.

The system can be used to build high capacity associative memories from a small number of neural elements. This memory will enable high accuracy real-time recall of partial spatio-temporal patterns that are stored in the memory. High capacity also opens new opportunities for low size, weight, power devices.

The use of a pattern-based memory with high capacity and real-time recall has the potential to provide human-like performance in a wide range of applications where current programmable machines have failed or been too limited. For example, in the case of a driver's assistant, such a memory system can alert a distracted driver of pedestrians at an intersection faster than a human.

Because pattern-based episodic memory is the key method by which humans make sense of and react to their environment (as well as learn new concepts), there are applications in robotics, manufacturing, intelligence analysis, encryption, autonomous driving, and prognostics.

(3) Specific Aspects of the Invention

For clarity and convenience, the present invention is described in two parts: (1) a training and index construction phase and, (2) an input and reconstruction phase.

(3.1) Training and Index Construction

Figure 3:
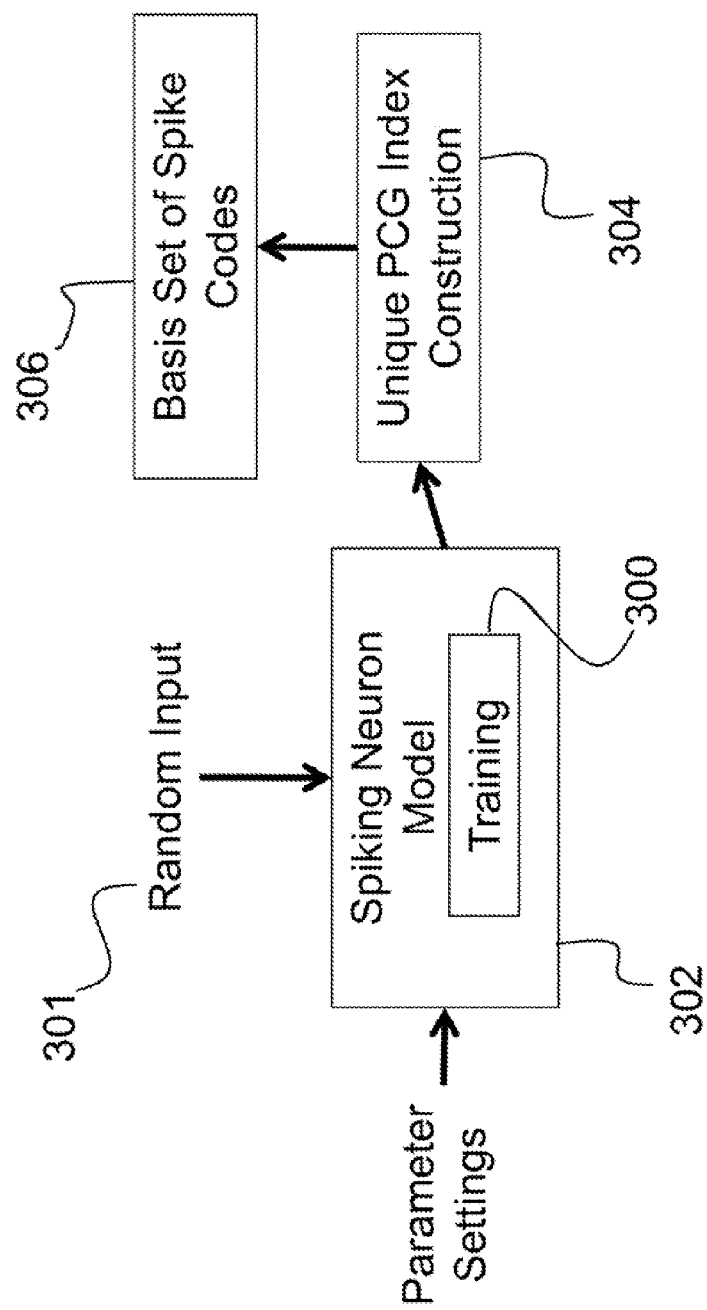
FIG. 3 is a flowchart depicting a Training and Index Construction phase.

Before reconstructing the input signal, an index must be built through a training and index construction phase, as depicted in FIG. 3. Training 300 uses spike time dependent plasticity (STDP) to sharpen the connections in the model 302, as was described by Izhikevich, E. in "Polychronization: Computation with Spikes", Neural Computation 18, 245-282 (2006), which is incorporated by reference as though fully set forth herein.

Use of STDP is optional, with the decision depending on the fidelity of the underlying spiking neuron network 302, a non-limiting example of which includes a Hierarchical Polychronous Spiking Memory (HPSM) model. As another non-limiting example of a suitable spiking neuron network 302, a simplified neural model consisting of N neurons (typically less than 30) can be used, each of whose outputs are connected to m of the N neurons. In this model, a very simple additive voltage node was used (such as that described by Maier, W and B. Miller, in "A Minimal Model for the Study of Polychronous Groups," arXiv:0806.1070v1, 2008); the neuron can fire only if it receives ≥2 inputs 301, and then the voltage for each of its m output neurons is incremented. The standard un-damped voltage increment is 1 mV per incoming spike, except in the case of a type of damping called voltage dissipation.

Figure 4:
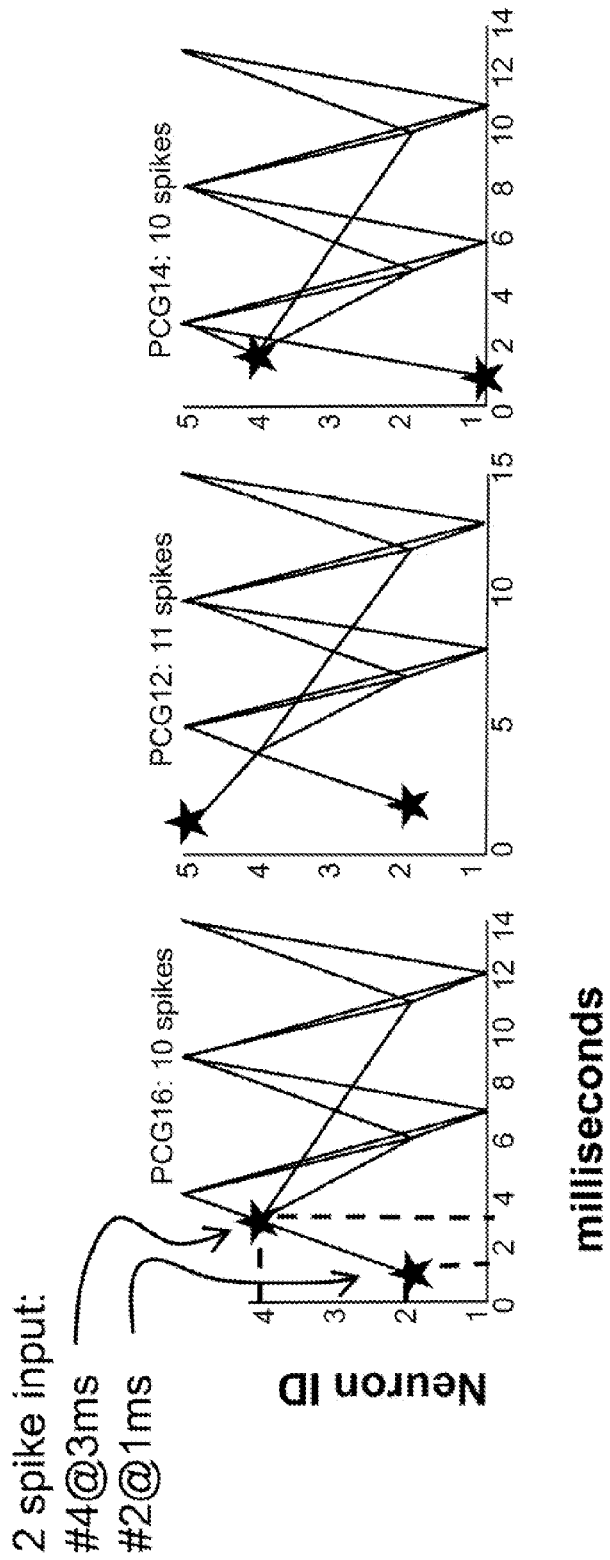
FIG. 4 is a series of graphs showing how different inputs cause the same spiking activity.

The procedure outlined by Maier et al. can be used to simulate each PCG. A firing matrix has one row per neuron, and the columns represent time steps in milliseconds. An N×N matrix of axonal delays was randomly populated with delays from 1 to dmax (default=5). Each input spike is recorded as a voltage of 2 at the (neuronID, spiketime) entry in the firing matrix. From then on, the firing matrix is scanned from the left-most column (time 1) to the right. In each column, any row that has a 2 is considered a firing neuron. The m postsynaptic neurons are looked up in the delay matrix, and a 1 is added to the appropriate cell (postsynaptic_neuronID, spiketime+delay). This procedure constructs an index of PCGs, many of which are not unique, and many of which are saturated due to no damping in the simplified network. Higher fidelity models (such as that described by Izhikevich, E. M. in "Polychronization: Computation with Spikes", Neural Computation 18, 245-282 (2006)) use a refractory period during which a neuron is fatigued and unable to fire to dampen out the network. PCGs that are minimally correlated with other PCGs provide more positive indications of the inputs 301. For example, FIG. 4 shows three different inputs that each cause exactly the same firing pattern. Shown are 3 different PCGs, from a 5-node network, with neuron IDs plotted on the Y-axis and firing times in milliseconds along the X-axis. The inputs are the leftmost 2 firings, and after that, all the firings are exactly the same.

A good metric for PCG correlation is edit distance, which is the summed cost of changing one sequence into another using insertion, deletion, and replacement operations (See Wikipedia, http://en.wikipedia.org/wiki/Levenshtein_distance, 2009). Edit distance methods can be implemented using dynamic programming methods and are used in spell checkers, protein sequence matchers, and similar applications. Costs of 1 were assigned to each of these operations, and also a new feature relevant to spiking neural models was added (i.e., a temporal discount factor, so it costs more if differences are earlier in the sequence). The cost is reduced from 1 for the first character of each PCG string down to 0.1 at the $k^{th}$ character, and down to 0 for the last elements of each PCG. This means the discount factor declines steeply to k, and then tails off more shallowly.

Figure 5A:
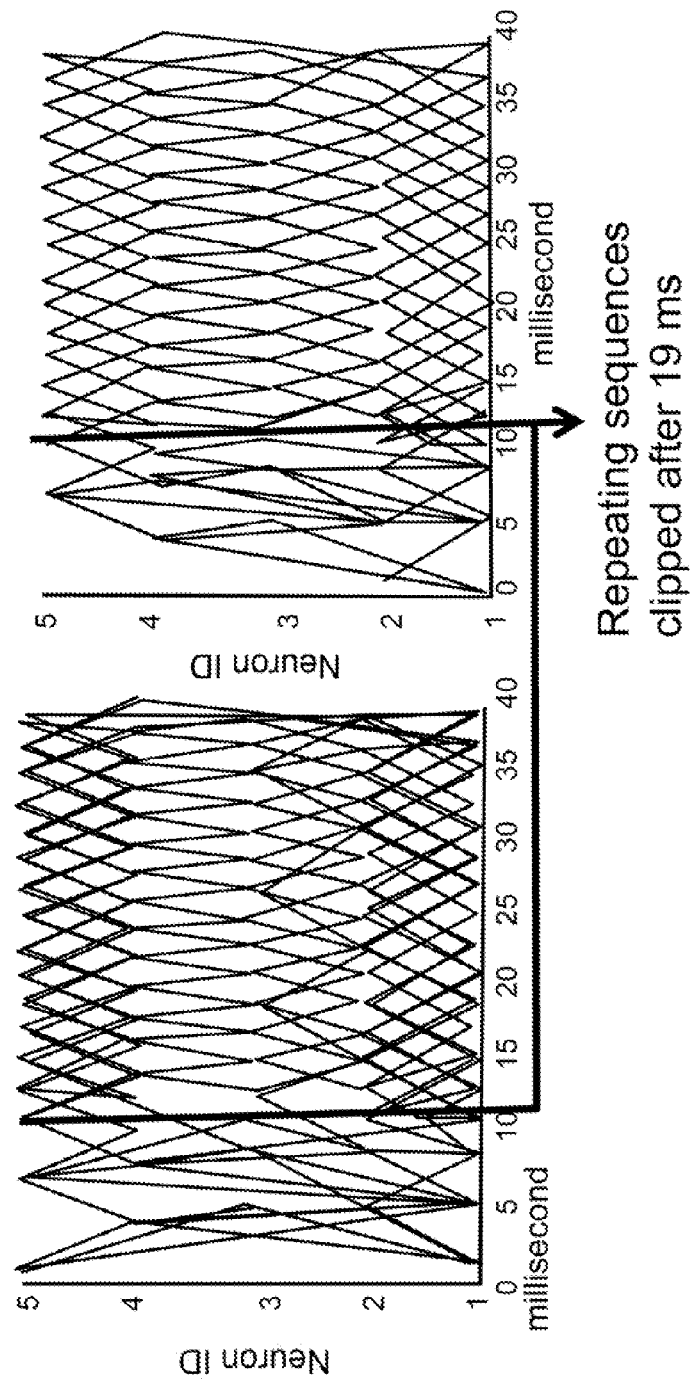
FIG. 5A is a graph depicting an infinite repeating sequence including every neuron, with activity clipped off at the point it saturates.

In experiments, it was determined that a saturation problem can exist in an undamped network. Two different sets of inputs can quickly lead to an infinite repeating sequence including every neuron, as shown in FIG. 5A. Such a pattern can be detected, with activity clipped off at the point it saturates. However, even after clipping, the sequences are exactly alike except for their two inputs, because of the particular random set of delays chosen for the network. This points to the need for further processing (described above) using the correlation metric of edit distance to throw out duplicates.

The network can be conditioned by adding damping to reduce the need of clipping saturated sequences. A non-limiting example of damping is to add a refractory period to the neural model. For example, this means that during the simulation, whenever a neuron fires, any spike activity that has added to voltage during the refractory period is cleared. To be more explicit, the simulation algorithm involves the following steps:

1. For each time t from 1 to T, do
2. For each neuron n from 1 to N do
3. If spikeArray(n,t)>=FIRING_THRESHOLD do
4. For each n2 from 1 to N do
5. If delayTable(n,n2)>0, do
6. spikeArray(n2, t+delayTable(n,n2)+=1;
7. for t2 from 1 to REFRACTORY_PERIOD do
8. spikeArray(n, t+t2)=0

Figure 5B:
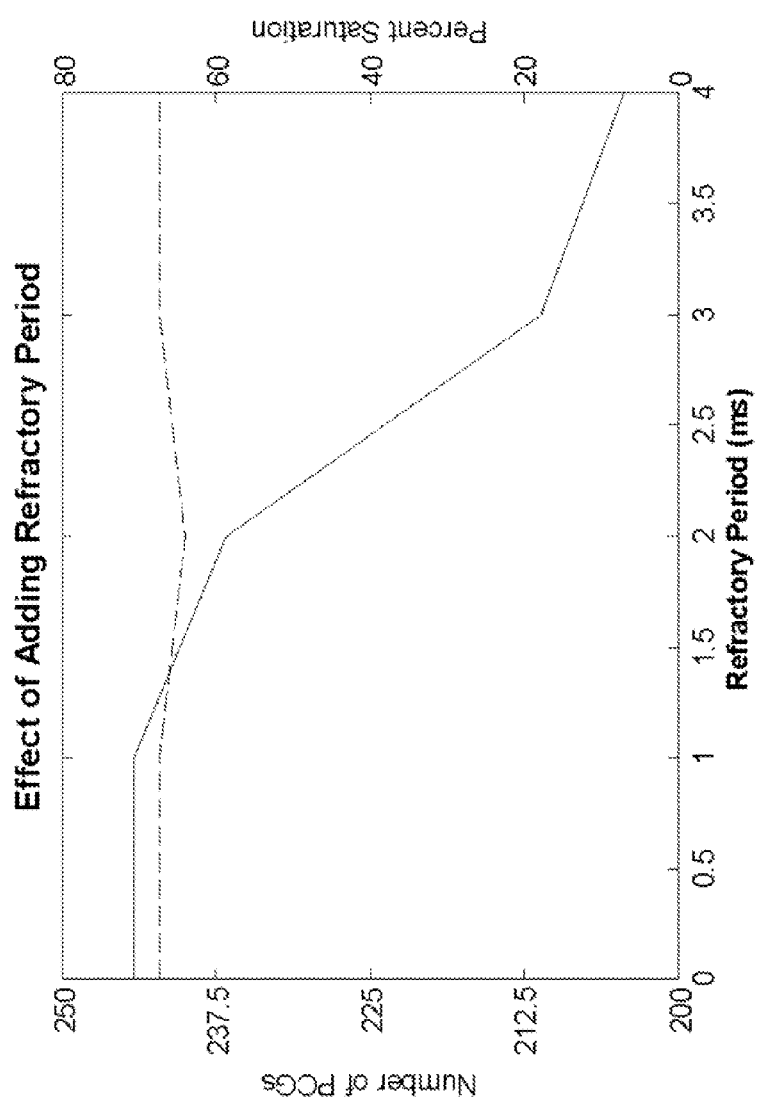
FIG. 5B is a graph depicting the results of adding different lengths of refractory periods with random delays.

The spikeArray is a 2D matrix of nodes vs. time, as illustrated in FIG. 4. The delayTable is an N×N array that contains the axonal delay between neurons on the X axis and neurons on the Y axis. Although this example employs symmetric delays with 0's along the diagonal, non-symmetric delays could be used without changes in the algorithm. FIG. 5B provides a graph illustrating the result of adding different lengths of REFRACTORY_PERIOD to the nodes of a 5-node network with random delays and a FIRING_THRESHOLD of 2. The graph shows that the percent of PCGs that become saturated and must be clipped is dramatically reduced; in this example 10-fold, from 70% to 7%. The graph also shows that adding the refractory period has no effect on the number of PCGs that the network can generate (the dotted line at about 240 PCGs for a 12 neuron network with each neuron connected to 9 others). A desired implementation employs a REFRACTORY_PERIOD of 3 ms, with any PCG firing sequences that still saturate being clipped.

Figures 6A, 6B:
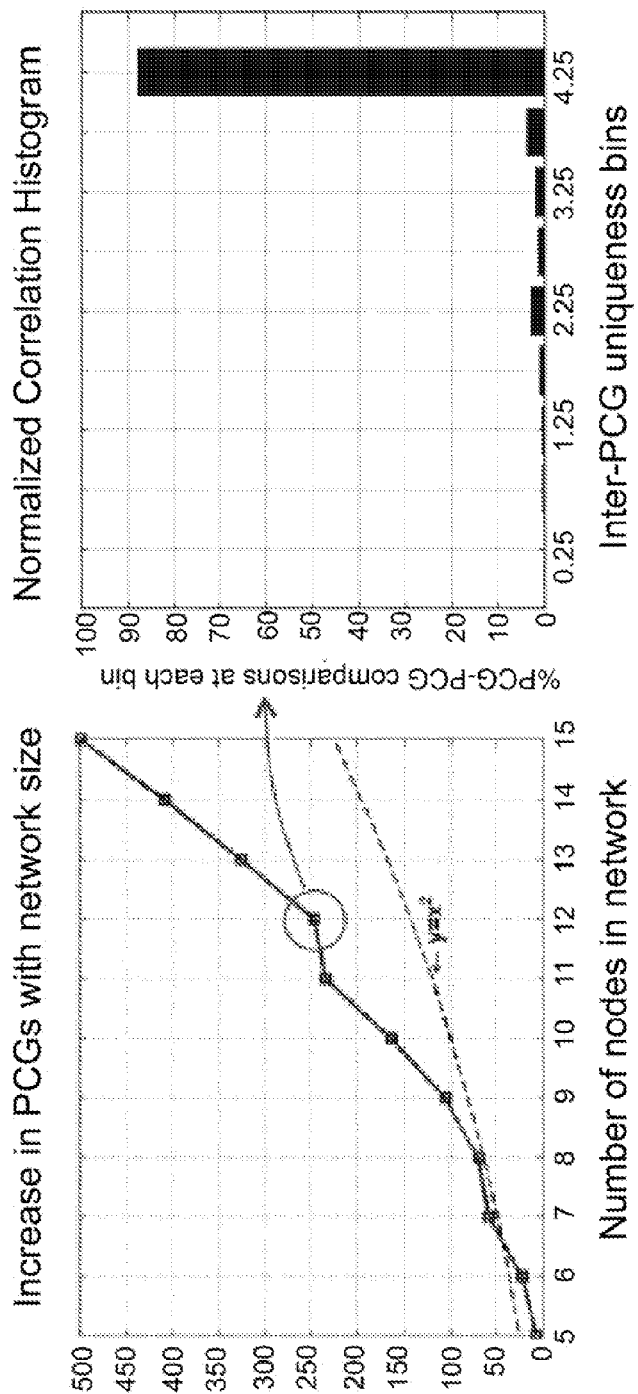
FIG. 6A is a graph depicting results of a 12-neuron network with 75% connectivity and 3 ms refractory period.
FIG. 6B is a histogram depicting unique PCGs.

For further illustration, FIG. 6A shows real data illustrating the dramatic increase in the number of PCGs with network size. The graph is not perfectly smooth because the models were approximately 75% connected, but roundup errors cause artifacts (e.g., 75% of 12 is 9, but 75% of 11 is also 9). FIG. 6B takes the 12-node network with 9 links per node, and shows a histogram of the correlation metric, edit distance, over the 240 PCGs that were left after a few were rejected because they were in the smallest edit-distance bin of the histogram (they were very similar). The histogram depicted in FIG. 6B shows that over 85% of the 240 PCGs are quite unique for a 12-node network, and none are very similar. This means that this set of PCGs are more characteristic of the inputs and operate as a good index of PCGs 304 (referring again to FIG. 3).

Figure 7:
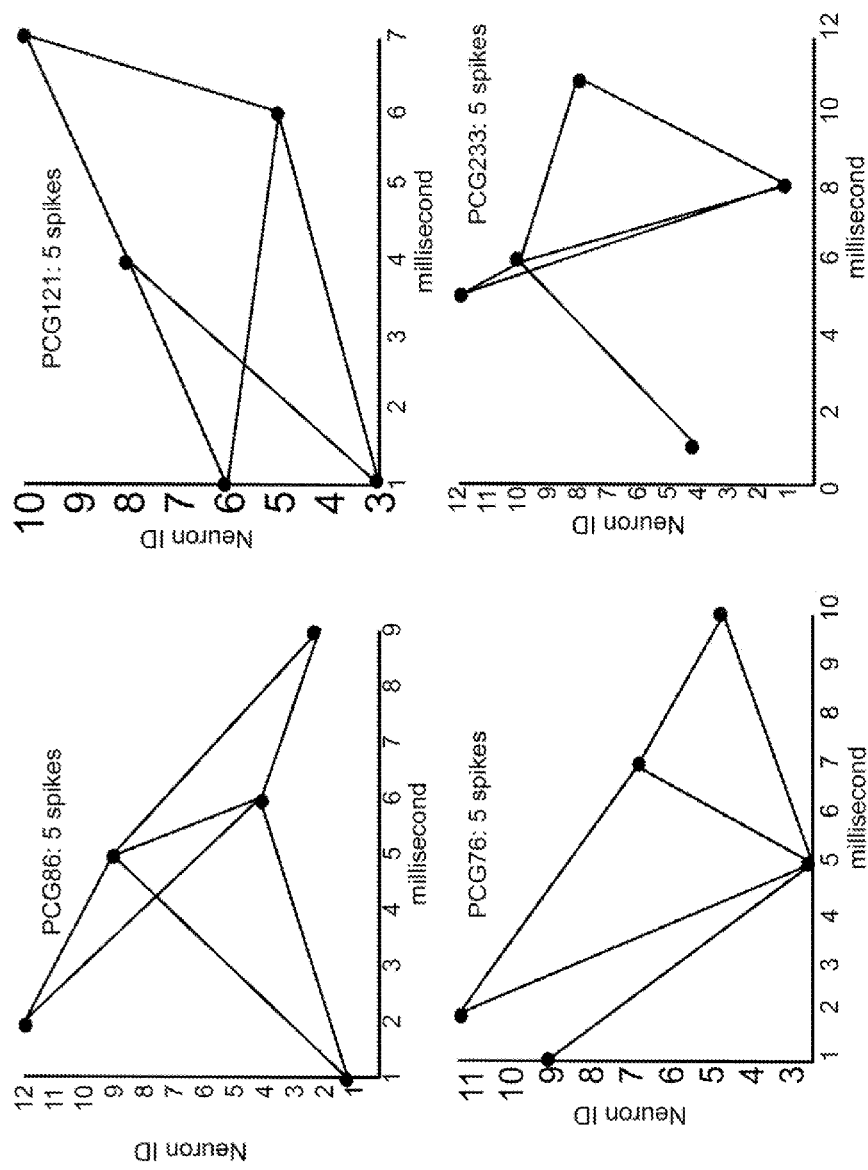
FIG. 7 includes graphs depicting four unique PCGs from an example 12-neuron network.

Next, it is described how the index of unique PCGs is used to create a basis set of spike codes from the model that can then be used to spike encode any input to the network. FIG. 7 shows graphs depicting 4 unique PCGs from the example 12-neuron network described above. A simple method for creating a basis set of spike codes uses only the first 2 anchor neurons. Anchor neurons are those neurons that fire at the correct time in order to cause a later, post-synaptic neuron to fire, thus initiating polychronous activity.

Figures 8A, 8B:
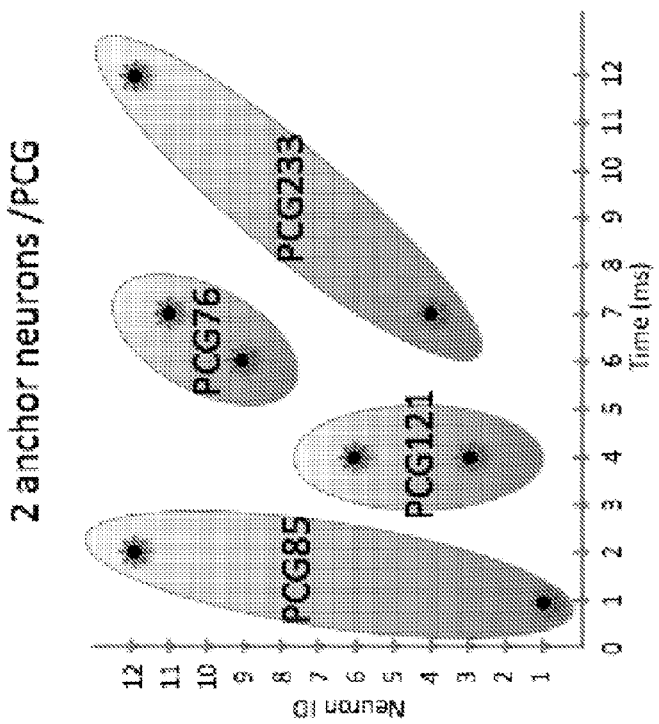
FIG. 8A is a temporal map of a spike basis set for four PCGS using two anchor neurons.
FIG. 8B is a table depicting a spike code basis set that matches the map of FIG. 8A.

FIG. 8A is a graph with a temporal map that depicts the spike code basis set for the four example PCGs of FIG. 7. Any suitable neurons can be used for the spike code basis set; for example, just the anchor neurons can be used, or alternatively, the basis set can be represented using any number of the neurons associated with a PCG. In this non-limiting example, the two anchor neurons were used, but the number of anchor neurons can also be varied and affects the number of PCGs that are detected in the model. FIG. 8B is a table depicting the spike code basis set that matches the map of FIG. 8A. The algorithm used to match the basis sets of spike codes from PCGs to the input is described below. Since there are potentially large numbers of PCGs and associated spike codes, it is also feasible to compress this basis set to use fewer spike codes to represent a spatio-temporal input, either during training or with prior knowledge of the expected inputs. The basis set may also be represented as spatio-temporal functions generating from the spiking activity of a PCG, which provides a more general method of constructing the basis set.

(3.2) Input and Reconstruction Phase

Figure 9:
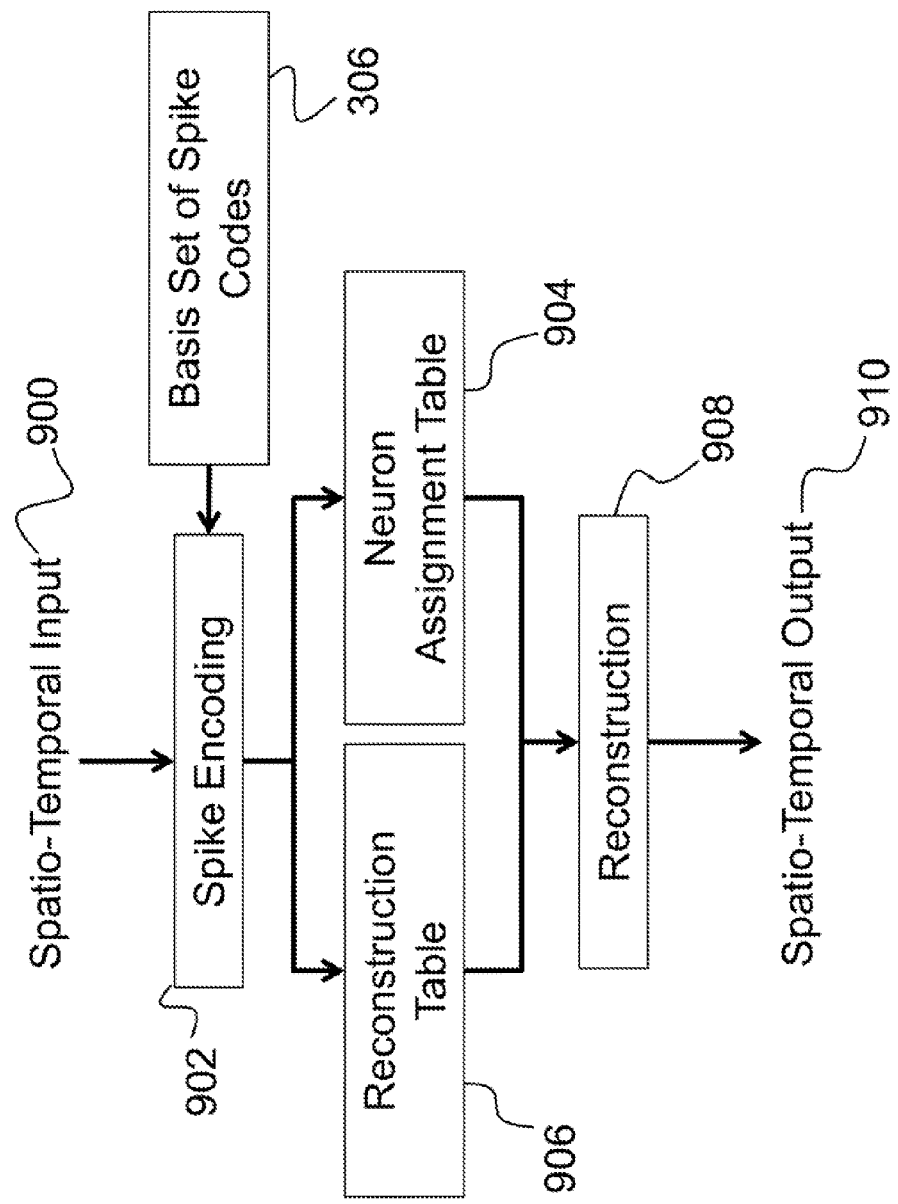
FIG. 9 is a flow chart illustrating steps in the input and reconstruction phase that allow the model to be used as a memory.

As noted above, the present invention also includes an input and reconstruction phase, as depicted in the flow chart of FIG. 9. The input and reconstruction phase uses the memory to recall particular input patterns that have been associated with PCGs during the training and index construction phase (as depicted in FIG. 3).

Given a basis set of spike codes 306 associated with PCGs, through spike encoding 902, the spike codes 306 can be used to represent an incoming input signal 900 (the input signal having spatial-temporal data). The accuracy of the match to the input signal 900 is dependent on the number and variability of PCGs in the model. However, even for small models (e.g., ~15 neurons) there are a large numbers of PCGs with a variety of spike timing.

Traditional approaches perform non-linear functional approximation using spike encoding, where the spikes can be placed at whatever rate (inter-spike interval) is needed to approximate the data to the desired level of accuracy. In contrast, the system according to the present invention constrains the set of spikes that can be used to represent the input signal 900 to only those that are part of the spike code basis set 302. Since these spike codes are derived directly from the PCGS, it is guaranteed that they are the spikes that will cause a specific unique PCG to activate. Two methods for spike encoding 902 are described below as (1) the anchor neuron method, and (2) the functional method. The output of spike encoding 902 is a table of the associations (i.e., assignment table 904) between the sub-divided signals and neurons, as well as a reconstruction table 906 that gives the spike firing time for each PCG.

Figure 10A:
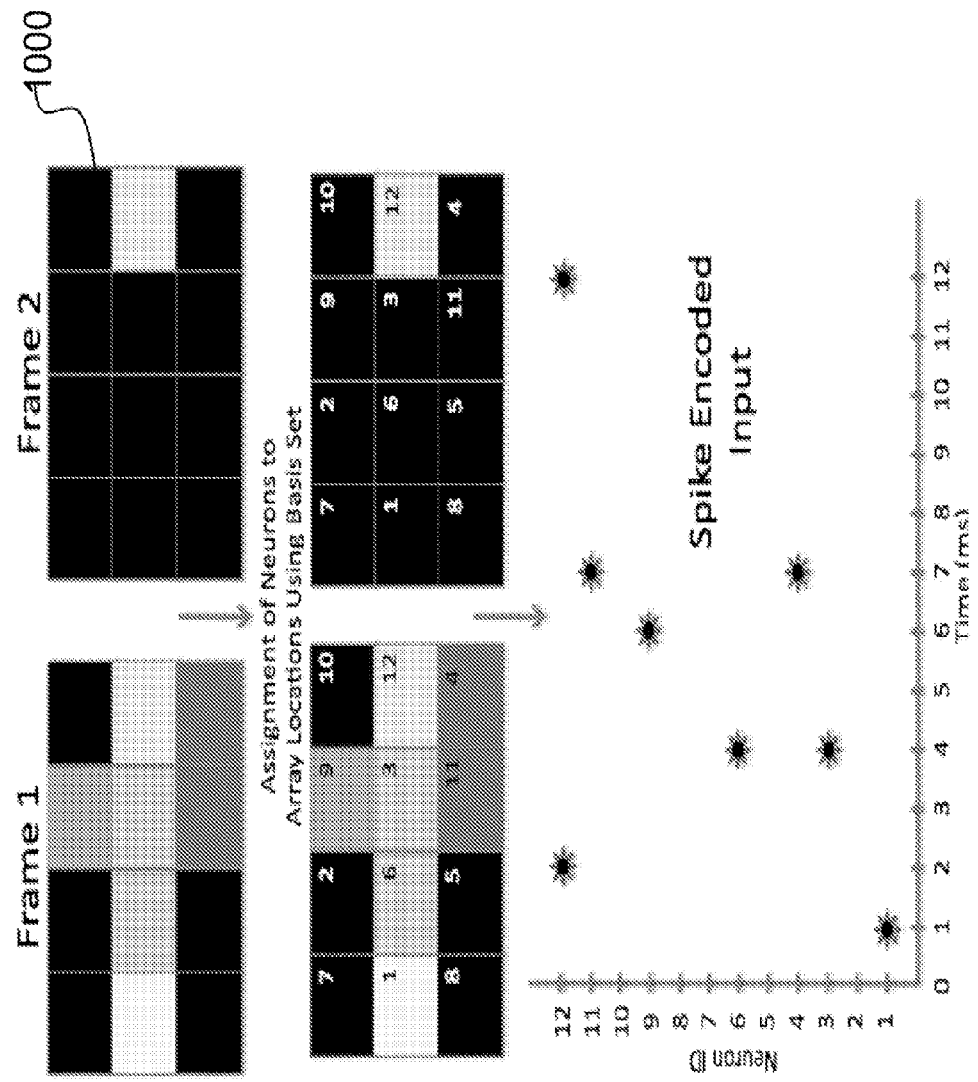
FIG. 10A is an illustration depicting spike encoding of two image frames using a basis set of spikes from PCGs.

In the Anchor Neuron Method, when spike encoding 902 the input 900, the system searches for a combination of anchor neurons (or a subset of the full set of PCG neurons) in the basis set 306 that can accurately represent the input spatio-temporal pattern. FIG. 10A shows an example of spike encoding the input for two frames of a 4×3 pixel image 1000 using the 4 PCGs and associated basis set from FIGS. 7, 8A and 8B. In this case, each neuron is randomly assigned in the model to a pixel, and the higher the gray level, the sooner the neuron spikes. This is similar to encoding schemes that use inter-spike intervals to represent a real-valued quantity (See Iannella, N., Back, A., "A spiking neural network architecture for nonlinear function approximation," Neural Networks for Signal Processing IX, 1999. Proc. Of the 1999 IEEE Signal Processing Society Workshop, August 1999, p. 139-146.), and sub-dividing the input, in this case the gray values of pixels. A key difference is that the system here constrains the choice of which spikes can be used to only those from the basis set. Any number of other types of inputs can be represented with this encoding scheme. The assignment algorithm proceeds by ordering the image pixels by intensity value, and for each pixel, a pair of anchor neurons are selected that match the brightest remaining pixel and any pixel of lower gray value. This process is repeated until all pixels have been assigned a spike time using a member of the basis set. Note that in this example, neuron 12 appears in 2 PCGs, the second of which is split across the frames. If no remaining basis set exactly matches the desired values, the closest remaining basis set is chosen, as defined by the minimum error in matching the elements of the set. As shown in FIGS. 10B and 10C, the output of spike encoding is the assignment table 904 as well as a reconstruction table 906. It should be noted that the assignment table 904 and reconstruction table 906 depicted in FIGS. 10B and 10C are non-limiting examples of such tables given the particular example used herein. This Anchor Neuron Method scales linearly with the size of the input.

Alternatively, the Functional Method uses a function to encode the input. Note that although a very simple case is described that uses only 2 anchor neurons from each unique PCG, the system according to the present invention applies to the use of any number of neurons from a PCG to represent the input. This can be accomplished by generating and storing a function from each PCG using any number of neurons, and then using that function to encode a portion of the input to a given degree of accuracy. This step can be accomplished with either a commonly used polynomial (or similar) basis set representing the function derived from the PCG, or by using the set of functions directly (potentially not a basis set). This functional model for each PCG is equivalent to saying that a particular PCG will respond to exactly the functional equivalent if it occurs in the input. Any remaining error between the input and the set of PCGs used to spike encode the input can be represented by an additional PCG function from the basis. This method allows for overlap and redundancy in the use of neurons in PCGs, and thus enables high capacity, and scales exponentially with the number of neurons independent of the size of input. In either method, each set of neurons (anchors or functional from PCGs) must then be connected to the input.

Referring again to FIG. 9, the assignment table 904 and reconstruction table 906 can be used to reconstruct 908 the input signal as a spatio-temporal output 910. Given a spike-encoded input 900 using the basis set 306, the method that reconstructs the input from the active PCGS can be implemented as a table lookup. For each PCG in temporal order in the reconstruction table 906, the anchor neurons are looked up (or the set of neurons in the PCG used in the basis) for that PCG, to identify their output location in the neuron assignment table 904. Through use of the reconstruction table 906 and assignment table 904, a value can be placed on each PCG based on its firing times. In the example depicted in FIGS. 10A through 10C, the system is reconstructing frame-based images, so a marker is needed for the start of a new frame, which can be explicit in the reconstruction table, or implied by the reuse of a neuron (in this case neuron 12 is reused so it can be used as a marker to start a new frame). For non-frame-based data, neurons can be selected for assignments that have not been used recently (e.g. based on a refractory period).

Figure 11:
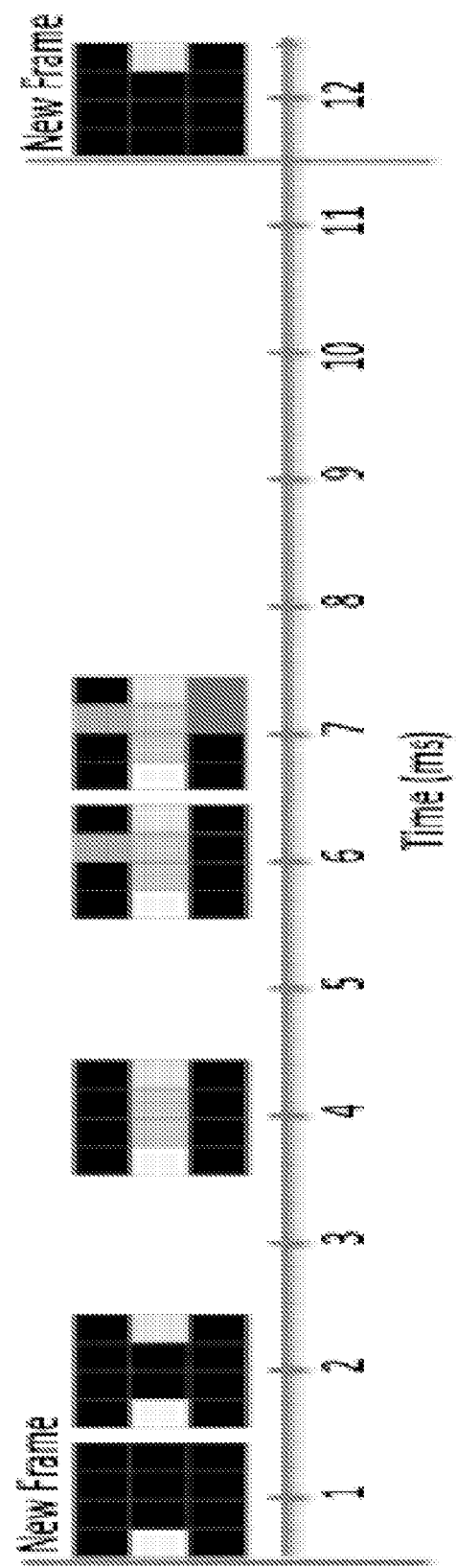
FIG. 11 shows an example of the reconstruction sequence for the data that is depicted in FIGS. 10A through 10C.

FIG. 11 shows an example of the reconstruction sequence for the data that is depicted in FIGS. 10A through 10C. Just as in the case of spike encoding, the functional representations of PCGs can be combined to accurately reconstruct the input signal.

What is claimed is:

1. A system for representing, storing, and reconstructing an input signal, the system comprising one or more processors and a memory, the memory storing computer code which, when executed by the one or more processors, cause the one or more processors to perform operations of:

constructing an index of unique polychronous groups (PCGs) from a spiking neuron network;

generating a basis set of spike codes from the unique PCGs;

receiving an input signal, the input signal having spatial-temporal data; and spike encoding the input signal using the basis set of spike codes from the unique PCGs.

2. The system as set forth in claim 1, further comprising an operation of reconstructing the input signal by performing operations of:

looking up in a reconstruction table, for each unique PCG in the basis set in temporal order according to firing times, anchor neurons;

looking up, in a neuron assignment table, an output location for each anchor neuron to place a value based on the firing times of each unique PCG; and compiling the output locations of the anchor neurons to reconstruct the input signal.

3. The system as set forth in claim 1, wherein constructing an index of unique PCGs further comprises an act of conditioning the spiking neuron network with random axonal delays.

4. The system as set forth in claim 1, wherein constructing an index of unique PCGs further comprises act of employing a refractory period in generating PCGs, with any PCG firing sequences that saturate being clipped from the index of unique PCGs.

5. The system as set forth in claim 1, wherein spike encoding the input signal further comprises an operation of searching for a combination of anchor neurons in the basis set that represents the spatial-temporal data.

6. The system as set forth in claim 1, wherein constructing an index of unique PCGs further comprises act of generating a histogram of a correlation metric to identify PCGs that fall below a predetermined threshold to exclude from the index of unique PCGs.

7. The system as set forth in claim 1, further comprising an operation of reconstructing the input signal by performing operations of:

looking up in a reconstruction table, for each unique PCG in the basis set in temporal order according to firing times, anchor neurons;

looking up, in a neuron assignment table, an output location for each anchor neuron to place a value based on the firing times of each unique PCG; and compiling the output locations of the anchor neurons to reconstruct the input signal;

wherein spike encoding the input signal further comprises an operation of searching for a combination of anchor neurons in the basis set that represents the spatial-temporal data; and wherein constructing an index of unique PCGs further comprises an acts of conditioning the spiking neuron network with random axonal delays, employing a refractory period in generating PCGs, with any PCG firing sequences that saturate being clipped from the index of unique PCGs, and generating a histogram of a correlation metric to identify PCGs that fall below a predetermined threshold to exclude from the index of unique PCGs.

8. A computer program product for representing, storing, and reconstructing an input signal, the computer program product comprising a non-transitory computer-readable medium having computer-readable instructions stored thereon, the instructions being executable by a computer having a processor for causing the processor to perform operations of:

constructing an index of unique polychronous groups (PCGs) from a spiking neuron network;

generating a basis set of spike codes from the unique PCGs;

receiving an input signal, the input signal having spatial-temporal data; and spike encoding the input signal using the basis set of spike codes from the unique PCGs.

9. The computer program product as set forth in claim 8, further comprising computer-readable instructions for causing the processor to perform operations of:

looking up in a reconstruction table, for each unique PCG in the basis set in temporal order according to firing times, anchor neurons;

looking up, in a neuron assignment table, an output location for each anchor neuron to place a value based on the firing times of each unique PCG; and compiling the output locations of the anchor neurons to reconstruct the input signal.

10. The computer program product as set forth in claim 9, further comprising computer-readable instructions for causing the processor to perform an operation of conditioning the spiking neuron network with random axonal delays.

11. The computer program product as set forth in claim 10, further comprising computer-readable instructions for causing the processor to perform an operation of employing a refractory period in generating PCGs, with any PCG firing sequences that saturate being clipped from the index of unique PCGs.

12. The computer program product as set forth in claim 11, further comprising computer-readable instructions for causing the processor to perform an operation of searching for a combination of anchor neurons in the basis set that represents the spatial-temporal data.

13. The computer program product as set forth in claim 12, further comprising computer-readable instructions for causing the processor to perform an operation of generating a histogram of a correlation metric to identify PCGs that fall below a predetermined threshold to exclude from the index of unique PCGs.

14. A computer implemented method for representing, storing, and reconstructing an input signal, comprising acts of causing one or more processors to execute instructions encoded on a memory, such that upon execution, the one or more processors perform operations of:

constructing an index of unique polychronous groups (PCGs) from a spiking neuron network;

generating a basis set of spike codes from the unique PCGs;

receiving an input signal, the input signal having spatial-temporal data; and spike encoding the input signal using the basis set of spike codes from the unique PCGs.

15. The computer implemented method as set forth in claim 14, further comprising acts of:

looking up in a reconstruction table, for each unique PCG in the basis set in temporal order according to firing times, anchor neurons;

looking up, in a neuron assignment table, an output location for each anchor neuron to place a value based on the firing times of each unique PCG; and compiling the output locations of the anchor neurons to reconstruct the input signal.

16. The computer implemented method as set forth in claim 15, further comprising an act of conditioning the spiking neuron network with random axonal delays.

17. The computer implemented method as set forth in claim 16, further comprising an act of employing a refractory period in generating PCGs, with any PCG firing sequences that saturate being clipped from the index of unique PCGs.

18. The computer implemented method as set forth in claim 17, further comprising an act of searching for a combination of anchor neurons in the basis set that represents the spatial-temporal data.

19. The computer implemented method as set forth in claim 18, further comprising an act of generating a histogram of a correlation metric to identify PCGs that fall below a predetermined threshold to exclude from the index of unique PCGs.

* * * * *